United States Patent

[11] 3,586,256

| [72] | Inventor | Bertie William Wellman<br>P.O. Box 36, Schriever, La. 70395 |
|---|---|---|
| [21] | Appl. No. | 3,923 |
| [22] | Filed | Jan. 19, 1970 |
| [45] | Patented | June 22, 1971 |

[54] HIGH-TENSION-WIRE-LAYING DEVICE FOR USE WITH HELICOPTERS
6 Claims, 11 Drawing Figs.

[52] U.S. Cl. ............................................. 242/86.7,
242/85, 242/156.2, 254/134.3 R
[51] Int. Cl. ................................................. B65h 75/40,
B65h 59/38
[50] Field of Search ......................................... 242/86.7,
86.5, 86.8, 156, 156.2, 129, 85; 254/134.3 R, 190

[56] References Cited
UNITED STATES PATENTS

| 2,635,827 | 4/1953 | Stemm et al. ................ | 242/86.7 |
|---|---|---|---|
| 3,211,394 | 10/1965 | Goode ......................... | 254/134.3 X |

FOREIGN PATENTS

| 966,368 | 6/1963 | Great Britain ................ | 242/129 |

*Primary Examiner*—George F. Mautz
*Assistant Examiner*—Gregory A. Walters
*Attorney*—Wilkinson, Mawhinney & Theibault

ABSTRACT: The present device relates to an apparatus for transporting and regulating slack in wire wound on reels and employed in laying high tension lines through swamps and marshes by use with a helicopter as the transporting vehicle.

PATENTED JUN 22 1971

INVENTOR.
B. W. WELLMAN
BY
Wilkinson, Mawhinney & Theibault
ATTORNEYS

INVENTOR.
B. W. WELLMAN

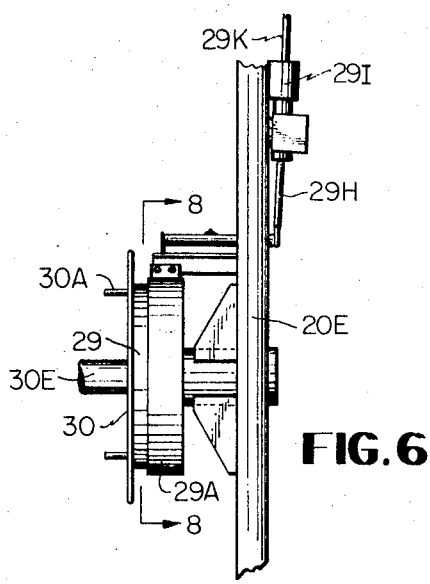
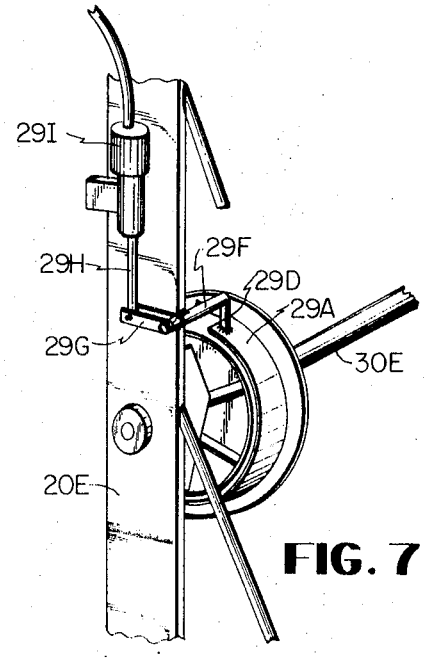
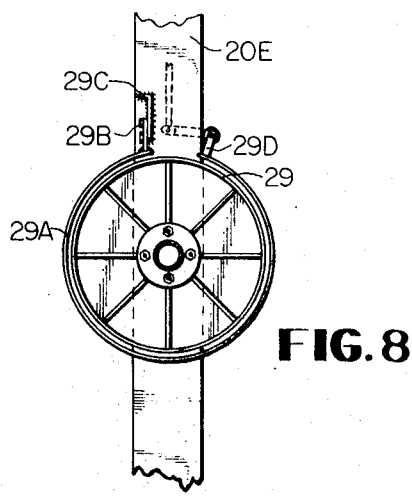
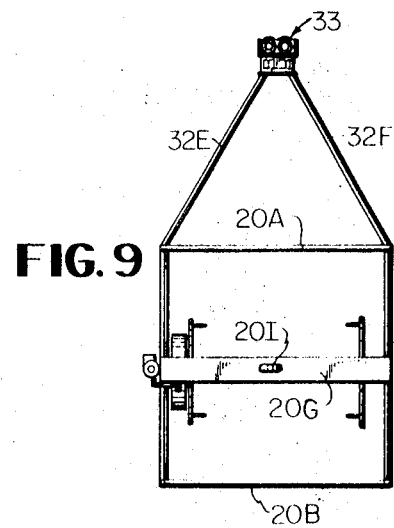
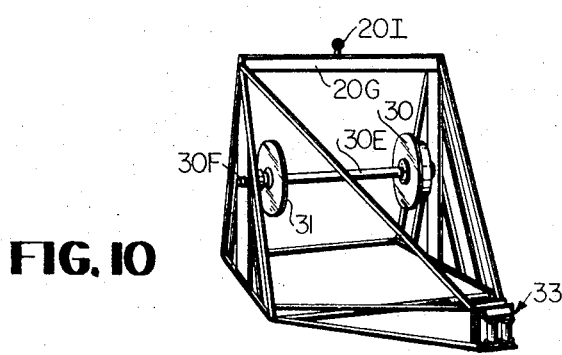
*INVENTOR.*
B. W. WELLMAN

HIGH-TENSION-WIRE-LAYING DEVICE FOR USE WITH HELICOPTERS

An object of the present invention is the provision of a high-tension-wire-laying device for stringing or laying high tension wire over marsh and swamp areas where heavy equipment and personnel may not readily walk from one support tower to another. This is particularly important in getting power to oil rigs located in marsh and swamp areas by way of example in the Louisiana marshes. The present invention permits, with the use of a helicopter, a positive system for controlling a large quantity of high tension wire which may be strung from one tower to another and the tension or slack of the wire of which may be varied with operational conditions.

Another object of the invention is to provide a simple lightweight system for mounting a reel containing high tension electric wire for suspension beneath a helicopter in such a manner that should the copter encounter any operational difficulties the entire reel and its supporting carriage may be jettisoned or dropped.

A further object of the present invention is the provision of an independent electrical system for controlling the brake on the pay out of the high tension wire reel in such a manner that an individual riding in the helicopter, either the pilot or a second person could regulate payout and tension slack between support towers.

A further object of the present invention is the provision of a strong lightweight frame structure for mounting rotatably therein a reel of high tension wire.

With the foregoing and other objects in view, the invention will be more fully described hereinafter, and will be more particularly pointed out in the claims appended hereto.

In the drawings, wherein like symbols refer to the like or corresponding parts throughout the different views:

FIG. 6 is a fragmentary front elevational view of one side of the apparatus of the present invention.

FIG. 7 is a rear perspective fragmentary view showing the brakedrum and band system of the present invention.

FIG. 8 is a vertical section taken on the line 8–8 in FIG. 6.

FIG. 9 is a top plan view of the apparatus of the present invention.

FIG. 10 is a front perspective view of the apparatus of the present invention with the wire reel removed.

Figure 1:
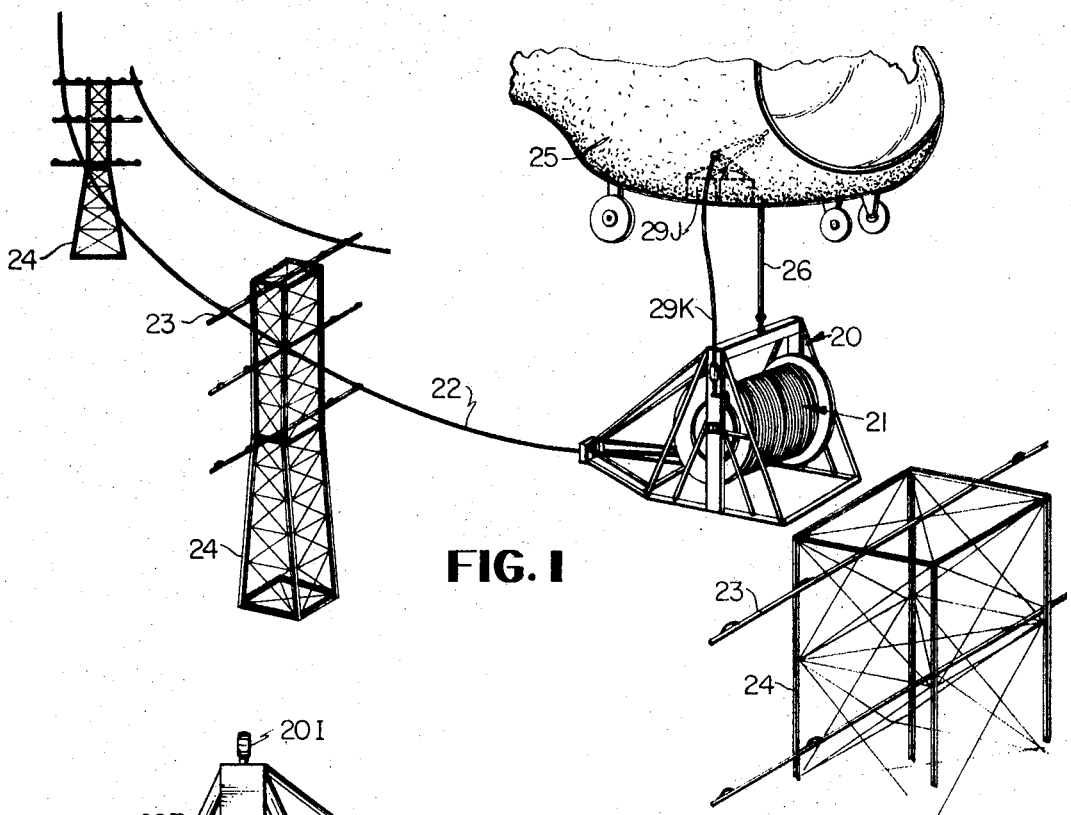
FIG. 1 is a perspective view of the apparatus of the present invention shown attached to a helicopter in the laying and stringing of high tension wire between spaced-apart towers in a transmission line.

Referring now to FIG. 1, 20 designates a main wire reel support frame having a reel 21 of high tension wire 22 rotatably mounted therein for laying the wire 22 over the crossarms 23 of a high tension tower 24. The unit is suspended from a helicopter 25 by a quick-release cable 26.

MAIN WIRE REEL SUPPORT FRAME

Figure 2:
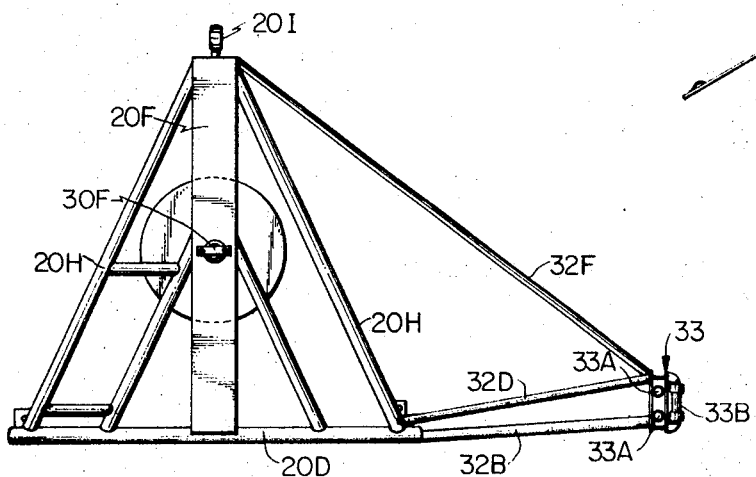
FIG. 2 is a side elevational view of the cable-reel-carrying device of the present invention.
Figure 11:
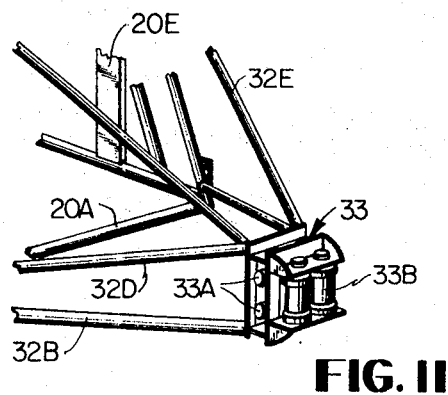
FIG. 11 is a fragmentary front perspective view of the apparatus of the present invention showing the wire-died means.
Figure 3:
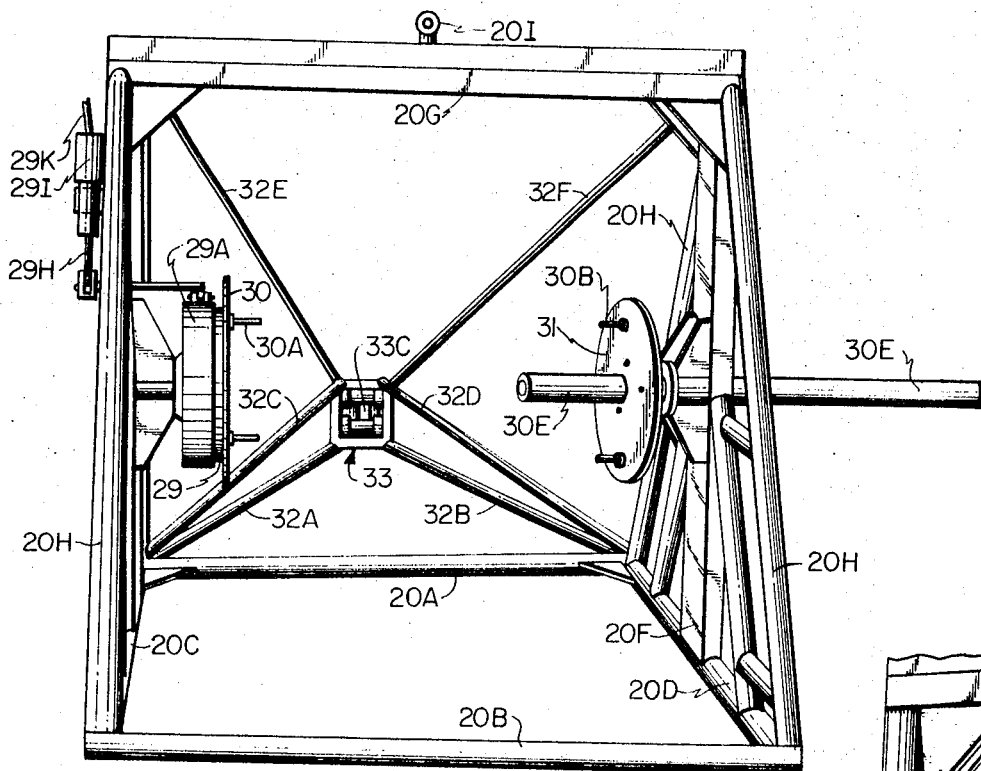
FIG. 3 is a rear elevational view of the apparatus of FIG. 2.
Figure 5:
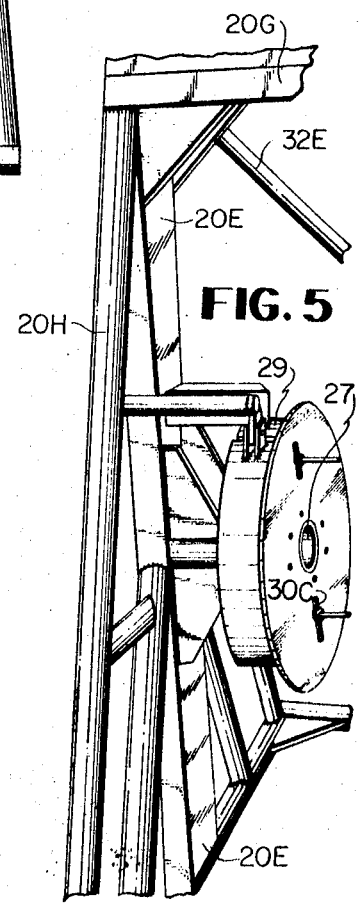
FIG. 5 is an inside fragmentary perspective view of a portion of FIG. 4.
Figure 4:
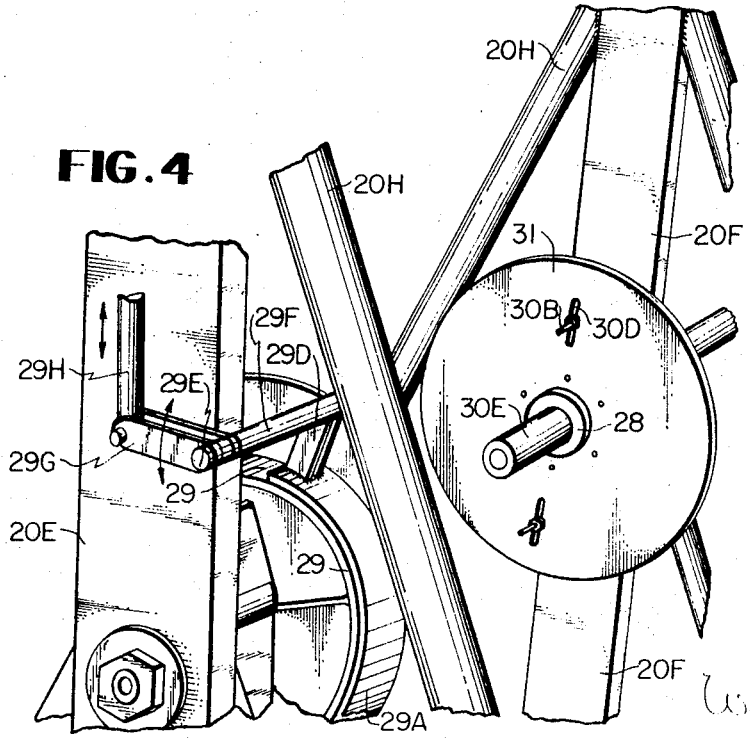
FIG. 4 is a fragmentary perspective view of the reel support elements of the apparatus of the present invention.

Referring now to FIGS. 2 and 3, the main wire reel support frame comprises a rectangular base frame 20A, 20B, 20C and 20D. The members 20C and 20D have centrally disposed standards 20E and 20F in which are journaled the wire reel rotary mount means. The standards 20E and 20F are joined at their top by a transport beam 20G. Load transfer and stabilizing members 20H are welded to provide a rigid stabilized construction. This structure is preferably of all aluminum-welded construction.

WIRE REEL ROTARY MOUNT MEANS

Mounted on the inside of each standard 20E and 20F are two stub shafts 27, 28 journaled for rotation. The shaft 27 has an external brakedrum 29 and reel-engaging disc 30 while shaft 28 has only a disc 31. Each disc 30, 31 has projections 30A, 30B for engaging the end flanges of the reel 21. Radial slots 30C, 30D permit the discs 30, 31 to accommodate reels of different diameters.

The main wire reel 21 is supported upon a shaft 30E which is axially slidable through the bearings 27, 28 and which passes through the spool structure of the reel. A rotary pivoted locking keeper 30F, FIG. 2 keeps the shaft 30E from shifting axially in use.

BRAKING MEANS

Referring now to FIGS. 4, 6, 7 and 8, the brakedrum 29 has a brake band 29A over a major portion of its circumference. One end of the band 29A is secured by rivets 29B to a bracket 29C welded to the riser 20E. The other end of the band 29A is connected to an arm 29D which is secured to rotate with a shaft 29E rotatably carried in a sleeve bearing 29F secured to the riser 20E. The other end of the shaft 29E has secured thereto a rocker arm 29G which is moved in the direction of the arrows in FIG. 4 by the up and down movement of a rod 29H driven by a reversible electric motor 29I in engagement with a worm rack and pinion drive to cause up and down movement of the rod 29H which in turn moves the brake band 29A toward or away from the brakedrum 29.

As shown in FIG. 1, the motor 29I receives its power from a 12-volt battery 29J carried by the helicopter 25 and which is communicated thereto through a cable 29K having a reversible switch (not shown) in circuit therewith which may be operated from the helicopter 25. The battery 29J, cable 29K, motor 29I and rod 29H define an electromechanical means for actuating the braking means.

WIRE GUIDE MEANS

Referring now to FIGS. 2, 3, 9 and 11, struts 32A, 32B, 32C and 32D extend from the rectangular base frame while struts 32E and 32F extend from the top of the risers 20E and 20F where the meet and support a roller guide assembly 33 which comprises a pair of horizontally disposed and spaced-apart rollers 33A and a pair of vertically disposed and spaced-apart rollers 33B which define a rolling guide opening 33C through which the wire 22 is payed out from the reel 21 under the tension of the braking system.

Centrally secured to the top of transport beam 20G is a pad eye 20I through which is passed a transport cable 26 the other end of which is secured to the helicopter with a quick-release device so that the helicopter pilot may jettison the entire high-tension-wire-laying device should the helicopter encounter operational difficulties dangerous to the safety of the helicopter and its passengers. The electrical control cable 29K is likewise equipped with a quick-release device.

OPERATION

The present apparatus is employed by placing a reel of high tension wire 21 in the main wire reel support frame 20 and running the leading end of the wire 22 through the roller guide assembly 33. The cable is attached to pad eye 20I and to the helicopter. The battery 29J is placed aboard the helicopter 25 and electrical cable 29K is connected between the battery 29J and motor 29I.

The helicopter 25 is then flown to the site where the wire stringing is to take place and the leading free end of wire 22 is secured to a crossarm and the copter moves from one tower 24 to another. The slack is kept out of the wire 22 by tightening or slackening the grip of the brake band 29A about the brakedrum. By driving the motor 29I in one direction the rod 29H will cause a rocking motion of shaft 29E which will either be in a direction to draw the brake band 29A against drum 29 or to back it away and allow the reel to pay out wire 22 as operational conditions dictate.

The pilot of the copter can make large adjustments in wire slack while the operator of the wire laying tension device may make vernier adjustments to permit linesmen the slack necessary to make a tie-in and to brake the reel paying out wire.

What I claim is:

1. For use with a helicopter, a high-tension-wire-laying device comprising a main wire reel support frame, wire reel rotary mount means carried by said reel support frame, braking means carried by said reel support frame and positioned to engage said wire reel rotary mount means, wire guide means carried at one end of said support frame, electromechanical means one element of which is adapted to be carried by the helicopter and another element of which is carried by said support frame for actuating the braking means to control tension on wire being strung from a wire reel carried in said rotary mount means, and quick-disconnect attaching means carried by said main frame and adapted to be connected to the helicopter to release the main wire reel support frame.

2. A high-tension-wire-laying device as claimed in claim 1 wherein said wire reel rotary mount means comprises a brakedrum and disc having a bearing opening therethrough rotatably mounted on said main frame and an axially slidable wire reel support shaft movable through a bearing support on said main frame and through the bearing opening in said brakedrum and disc.

3. A high-tension-wire-laying device as claimed in claim 1 wherein said braking means comprises a brake band passing about a brakedrum adapted to be connected to the wire containing reel, one end of said brake band being anchored to the main frame and the other end being moved into and out of engagement with the brakedrum by said electromechanical means.

4. A high-tension-wire-laying device as claimed in claim 3 wherein said electromechanical means is a battery driven electrical motor which drives a worm shaft to cause rocking movement of an arm to which the movable end of the brake band is attached to tension or slacken same about the brakedrum.

5. A high-tension-wire-laying device as claimed in claim 1 wherein said wire guide means is a noselike projection at one end of the main frame having a pair of spaced-apart horizontally disposed rollers and a pair of spaced-apart vertically disposed rollers between each pair of which passes the wire to be layed from said reel.

6. A high-tension-wire-laying device as claimed in claim 4 further comprising a battery and control cable and switch adapted to be carried by the helicopter and releasably connected to the electric motor which controls the tensioning of the brakedrum.